United States Patent Office 2,907,726
Patented Oct. 6, 1959

2,907,726

DIPHENOLIC PENTANOIC ACID, ALKYL ACID ESTER, POLYEPOXIDE REACTION PRODUCTS

Sylvan O. Greenlee, Racine, Wis., assignor to S. C. Johnson & Son, Inc., Racine, Wis.

No Drawing. Application January 16, 1957
Serial No. 634,424

21 Claims. (Cl. 260—19)

This invention relates to new products and compositions resulting from the reaction of polyepoxides with mixed esters and the modification of such compositions with condensates of aldehydes and ammonia derivatives or condensates of aldehydes and phenols in regulated proportions to produce valuable compositions useful in the manufacture of varnishes, molding compositions, adhesives, films, and molded articles. More particularly, the mixed esters are the reaction products of hydroxyaryl-substituted aliphatic acids and an ester of an alcohol and an aliphatic acid of at least about 10 carbon atoms, containing functional groups consisting of hydroxyl and epoxide which are esterified with the carboxyl group of the hydroxyaryl acid. The invention includes initial mixtures or compositions as well as intermediate and final reaction products and methods for their production.

It is an object of this invention to produce new compositions of matter from suitable proportions of mixed ester and polyepoxide, with or without modification with aldehyde condensates, which compositions are suitable for use in coating compositions, molding compositions, and adhesives.

Another object of this invention is the production of reaction mixtures of the aforesaid epoxides and mixed esters, with or without aldehyde condensates, which are capable of reaction on the application of heat to form insoluble, infusible products.

Another object of this invention is the production of new reaction mixtures as described above which are stable at ordinary temperatures for long periods of time and which may be converted to insoluble, infusible products by the application of heat with or without the addition of catalyst.

Another object of this invention is to provide for production of co-conversion products of polyepoxides and mixed esters, aforesaid products modified with aldehyde condensates, with such co-conversion products being characterized by extreme hardness, flexibility, and resistance to water, alkali, and organic solvents.

Other objects of the invention will appear from the following more detailed description and with particular reference to the illustrative examples.

It is well known in the art that polyhydric phenols are capable of polymerizing with aldehydes and with polyepoxides to form valuable insoluble, infusible products. One of the difficulties encountered by the formulator of products from these phenolic reaction materials is that of obtaining a suitable plasticizer so that the hard, infusible conversion products possess the desired flexibility and toughness. One of the most commonly used class of plasticizer informulating coating and molding materials is that which embraces the vegetable oil and fish oil acid esters as well as the long-chain saturated fatty acid esters. In using these materials as plasticizers, however, the formulator is limited to choosing resins which are sufficiently compatible with these materials so that separation into two physical phases does not take place during application or during conversion of the product. It is also well known that the alkylidene diphenols, such as the well-known "Bisphenol A" of commerce 2,2-bis(4-hydroxyphenyl)propane, forms, in reactions with aldehydes, compositions which are exremely immiscible with most commercial plasticizers, including the long-chain acid esters. It will be recognized from the following description that the before-mentioned hydroxyaryl-substituted acids are alkylidene diphenols containing within the same molecule a carboxyl group. It has now been found that this carboxyl group may be esterified with the hydroxyl groups or epoxide groups of hydroxylated and/or epoxidized long-chain acid esters to produce complex polyhydric phenols in which the polyhydric phenols are chemically bound to the plasticizing long-chain acid esters. Such compositions may be reacted with polyepoxides alone or modified with aldehyde condensates to yield self-plasticized, insoluble, infusible compositions possessing particular value in the protective coating, adhesive, or molding fields.

In general, the epoxides contemplated for use with the mixed esters are compounds containing an average of more than one up to about twenty epoxide groups per molecule. Such compounds, free from functional groups other than epoxide, carboxyl, and hydroxyl groups, are reactive with active hydrogen-containing groups such as the hydroxyl groups supplied by the mixed esters herein contemplated. Typical epoxides which have been found to be operable are complex resinous polyepoxides, resinous polyepoxide polyesters, epoxidized natural oils, and simple aliphatic polyepoxides.

The reaction products of this invention are prepared by converting the epoxide groups with the mixed esters which are derivatives of a bis(hydroxyaryl)substituted aliphatic acid and long chain epoxidized or hydroxylated aliphatic acid esters and, if desired, modifying said composition with aldehyde condensates. Conversion of the epoxide groups is effected by active hydrogen present in phenolic hydroxyl, methylol or amino groups which are supplied by the other reactants.

The hydroxylated or epoxidized long chain acid esters, reacted with the hydroxyaryl-substituted aliphatic acid to form one component of this invention, are those containing the residues of acids of at least about ten carbon atoms and low molecular weight alkanols. It is important that the acids selected contain a group which will esterify a carboxyl group. Thus, the desired acid should contain a hydroxyl and/or epoxide group or it should be capable of modification for the purpose of adding such reactive groups. Naturally-occurring vegetable or fish oils are eminently suitable for this purpose, many being found in the form of esters and containing hydroxyl groups or epoxidizable olefin linkages. Naturally-occurring castor oil, a triglyceride containing hydroxylated ester chains, may be used as such or it may be hydrogenated to saturate the double bond present giving a triglyceride of 12-hydroxystearic acid. Naturally-occurring oiticica oil which is essentially a triglyceride of a keto-acid, licanic acid, may also be hydrogenated to give a triglyceride of 4-hydroxystearic acid. Oiticica oil might also be selectively reduced so as to convert the ketone groups to hydroxyl groups without reducing the olefin unsaturation, thus giving an unsaturated hydroxy ester. Unsaturated vegetable and fish oils may be oxidized by air by a commercial process, usually referred to as blowing, to form products containing esterifiable hydroxyl content. In certain cases, it may be desirable to obtain the hydroxy acid esters of alcohols other than glycerol; in which case, such esters as those of the pentaerythritols, glycols, and the simple monohydric alcohols, such as methyl, ethyl, and butyl alcohols, might be used.

Since an epoxide group is essentially an anhydride of a glycol, epoxidized products are readily esterifiable by acids, making the products obtained by the epoxidation of unsaturated oil acid esters suitable for use herein. Illustrative materials are the epoxidized vegetable oils, such as corn oil, cottonseed oil, soyabean oil, etc. Again, it may often be desirable to use esters other than the naturally-occurring glycerides. The epoxidized esters of, for example, vegetable oil acids with such polyhydric alcohols as the pentaerythritols and the glycols as well as the esters of the monohydric alcohols, such as methyl, ethyl, and butyl alcohols, are very valuable in preparing the compositions used in this invention.

The long-chain unsaturated acid esters contemplated may also include the complex mixed products, as exemplified by an epoxidized alkyd resin prepared from a mixture of phthalic anhydride, soyabean oil acids, and glycerol. Acids having lower molecular weights may be used to prepare the desired esters for use herein. A lower limit of about 10 carbon atoms has been set since the shorter chain acids are of little value in plasticizing the resinous compositions of this invention. An example of a commercially available lower acid is undecenoic acid, a decomposition product of castor oil acids. It is suitable for present purposes, conforming to the requirements set forth hereinabove, in that it may be readily epoxidized or hydroxylated at the point of unsaturation. In general, the components of these complex mixed products may be a polyol, a polycarboxylic acid, and a long-chain monocarboxylic acid.

The hydroxyaryl-substituted acid contemplated for use herein should have two hydroxyaryl groups attached to a single carbon atom. The preparation of such an aryloxy acid is most conveniently carried out by condensing a keto-acid with the desired phenol. Experience in the preparation of bisphenol and related compounds indicates that the carboxyl group of the keto-acid should be positioned next to a terminal methyl group in order to obtain satisfactory yields. Prior applications, Serial Nos. 464,607 and 489,300 (now abandoned), filed October 25, 1954 and February 18, 1955, respectively, disclose a number of illustrative compounds suitable for use as the Diphenolic Acid and methods of preparing the same. These materials, which are referred to for convenience as Diphenolic Acid or DPA, consist of the condensation products of levulinic acid and phenol, substituted phenols, or mixtures thereof. It is to be understood that the phenolic nuclei of the Diphenolic Acid may be substituted with any groups which will not interfere with the reactions contemplated herein. For example, the nuclei may be alkylated with alkyl groups of from 1 to 5 carbon atoms as disclosed in my copending application Serial No. 489,300 (now abandoned) or they may be halogenated. The Diphenolic Acid derived from substituted phenols, such as the alkylated phenols, are sometimes more desirable than the products obtained from unsubstituted phenols since the alkyl groups provide better organic solvent solubility, flexibility, and water resistance. However, the unsubstituted product is usually more readily purified.

The preparation of hydroxyaryl-substituted acid esters of hydroxylated and/or epoxidized oil acid esters, referred to herein simply as mixed esters for convenience, is accomplished by the usual esterification processes well known in the art and which are more fully described in the Greenlee copending application, S.N. 522,169, filed July 14, 1955 (now abandoned), entitled "Synthetic Esters." A continuation in part of this application was filed on February 10, 1958, and has the S.N. 714,050.

The degree of Diphenolic Acid modification of the hydroxylated or epoxidized oil acid esters may be varied widely in order to give a wide range of compositions for the formulation of various products. For example, it may be desirable to esterify a hydroxylated triglyceride vegetable oil with 1 mol of Diphenolic Acid per mol of the oil. For another application it may be desirable to esterify a hydroxylated triglyceride oil with 3 mols of Diphenolic Acid per mol of triglyceride. It would be possible and desirable for certain other applications to esterify, for example, an epoxidized soyabean oil with as much as 3 to 7 mols of a Diphenolic Acid per mol of the triglyceride oil.

Examples 1 to 5, inclusive, illustrate the preparation of Diphenolic Acid esters of hydroxylated or epoxidized oil acid esters. The proportions given are expressed as parts by weight unless otherwise indicated. Acid values represent the number of milligrams of KOH required to neutralize a 1-gram sample. Softening points were determined by Durrans' Mercury Method (Journal of Oil and Color Chemists' Association, 12, 173–175 [1929]).

EXAMPLE 1

In a 3-neck flask provided with a mechanical agitator, a thermometer, and a reflux condenser attached through a side arm water trap was placed 770 parts of castor oil. The castor oil was heated with continuous agitation until the temperature reached 85° C. at which point 500 parts of 4,4-bis(4-hydroxyphenyl)pentanoic acid were added. Throughout the heating period a slow stream of nitrogen was bubbled through the reaction mixture. The temperature was gradually raised to 215° C. and held at 215–230° C. for 6½ hours to yield 1225 parts of a semi-liquid product having an acid value of 13.5.

EXAMPLE 2

Similarly, a mixture of 750 parts of blown castor oil and 500 parts of 4,4-bis(4-hydroxyphenyl)pentanoic acid was gradually heated to 210° C. and held at 210–225° C. for a period of 12 hours, yielding 1149 parts of a semi-liquid having an acid value of 13.6.

EXAMPLE 3

Following the procedure described in Example 1, a mixture of 132 parts of epoxidized butyl oleate (equivalent weight to epoxide, 410) and 88 parts of 4,4-bis(4-hydroxyphenyl)pentanoic acid was heated for a period of 12 hours at 200–235° C. to give 165 parts of a solid product having an acid value of 15.1.

The epoxide values used herein were determined by refluxing for 30 minutes a 2-gram sample with 50 milliliters of pyridine hydrochloride in excess pyridine. After cooling to room temperature, the sample is then back-titrated with standard alcoholic sodium hydroxide. The pyridine hydrochloride solution was prepared by adding 20 milliliters of concentrated HCl to a liter of pyridine.

EXAMPLE 4

A mixture of 600 parts of Admex 710 (an epoxidized soyabean oil, having an equivalent weight to epoxide of 260, obtained as a commercial product from Archer-Daniels-Midland Company) and 600 parts of 4,4-bis(4-hydroxyphenyl)pentanoic acid was heated for 9 hours at 190–215° C., producing 1153 parts of a hard, brittle resin having an acid value of 17.7 and a softening point of 90° C. (Durrans' Mercury Method).

EXAMPLE 5

A. *Preparation of alkyd resin*

In a flask provided with a thermometer, a mechanical agitator and a condenser attached through a water trap was placed 434 parts of glycerol, 1270 parts of oleic acid and the temperature gradually raised with agitation to 220° C. over a period of 2 hours. Reaction was continued for a period of 1½ hours at this temperature until the acid value on the mixture of glycerol and oleic acid had reached 10. At this point 617 parts of phthalic anhydride was added and the temperature was gradually increased to 250° C. and held at this temperature for 2 hours and 30 minutes until the acid value had again decreased to below 10. The final constants on this product were acid value of 6.3, iodine value 69, and viscosity A–1

(Gardner-Holdt bubble viscosimeter) at a nonvolatile content of 60% in xylene.

B. *Epoxidation of alkyd resin*

In a 3-neck flask provided with a thermometer, a mechanical agitator, and a reflux condenser was placed 70 parts of dehydrated acid form of a cation exchange resin (Dowex 50-X-8, 50–100 mesh, Dow Chemical Company, a sulfonated styrene-divinylbenzene copolymer containing about 8% divinylbenzene, the percent divinylbenzene serving to control the amount of crosslinkage. The Dowex resins are discussed in publications entitled "Ion Exchange Resins No. 1" and "Ion Exchange Resins No. 2," copyright 1954 by Dow Chemical Company, the publications having form number Sp32–254 and Sp31–354, respectively), and 15 parts glacial acetic acid. The mixture of cation exchange resin and acetic acid was allowed to stand until the resin had completely taken up the acid. To this mixture was added 610 parts of the alkyd resin solution described in the above paragraph and 488 parts of xylene. To the continuously agitated reaction mixture was added dropwise 38 parts of 50% hydrogen peroxide. The reaction temperature was held at 60° C. until a milliliter sample of the reaction mixture analyzed less than one milliliter of 0.1 N sodium thiosulfate in an iodometric determination of hydrogen peroxide. The product was then filtered, finally pressing the cation exchange resin filter cake. The epoxide equivalent on the nonvolatile content was 550.

In order to remove the free acidity from the epoxidized product, 400 parts of the solution were thoroughly mixed with 110 parts of the dehydrated basic form of Dowex 1 (an anion exchange resin of the quaternary ammonium type. Dowex 1 is a styrene-divinylbenzene copolymer illustrated by the formula RR′$_3$N$^+$OH$^-$ where R represents the styrene-divinylbenzene matrix and R′ is a methyl group, manufactured by the Dow Chemical Company). The resulting mixture was then filtered, followed by pressing as much of the solution as possible from the anion exchange resin cake.

C. *Esterification of epoxidized alkyd resin with a Diphenolic Acid*

A mixture of 51.5 parts of 4,4-bis(4-hydroxyphenyl)-pentanoic acid dissolved in 81 parts of dioxane and 292 parts of the epoxidized alkyd resin solution (34% nonvolatile) was gradually heated with constant agitation to 175° C. over a period of about 6 hours permitting the solvent to be removed by distillation as the temperature rose from 125–175° C. The temperature was held at 175–180° C. for an additional half-hour to give 149 parts of a hard resin having an acid value of 17.1 and a softening point of 80° C.

As expressed hereinbefore, the mixed esters react with polyepoxides to form valuable compositions for polymerization to insoluble, infusible products. Such products are inherently flexible due to the plasticizing action of the chemically combined plasticizer, the long chain acid residues. Illustrative of the epoxide compositions which may be employed in this invention are the complex epoxide resins which are polyether derivatives of polyhydric phenols with such polyfunctional coupling agents as polyhalohydrins, polyepoxides, or epihalohydrins. These compositions may be described as polymeric polyhydric alcohols having alternating aliphatic chains and nuclei connected to each other by ether linkages, containing terminal epoxide groups and free from functional groups other than epoxide and hydroxyl groups. It should be understood that significant amounts of the monomeric reaction products are often present. This would be illustrated by I to III below where $n$ equals zero. Preparation of these epoxide materials as well as illustrative examples are described in U.S. Patents 2,456,408, 2,503,726, 2,615,007, 2,615,008, 2,668,807 2,-688,805, and 2,698,315. Well-known commercial examples of these resins are the Epon resins marketed by the Shell Chemical Corporation. Illustrative of the preparation of these epoxide resins are the following reactions wherein the difunctional coupling agent is used in varying molar excessive amounts:

Polyhydric phenol and an epihalohydrin bis(hydroxyphenyl)isopropylidene + excess epichlorohydrin

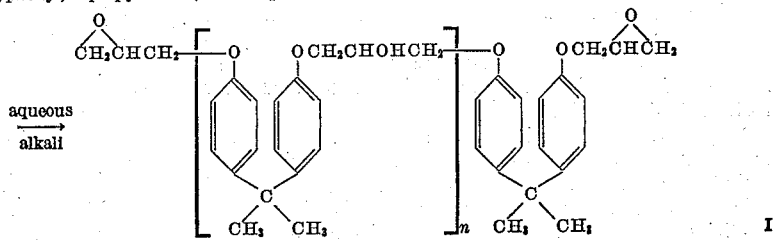

I

Polyhydric phenol and a polyepoxide bis(hydroxyphenyl)isopropylidene + excess butylene dioxide

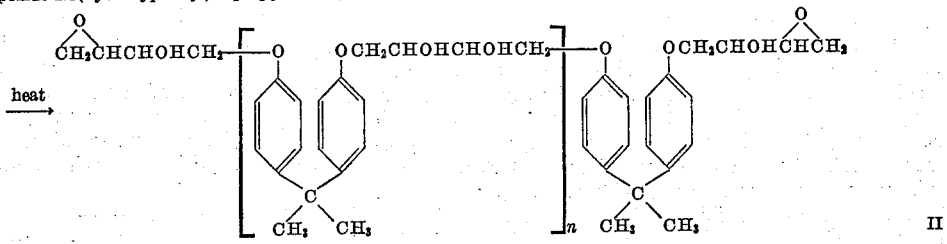

II

Polyhydric phenol and a polyhalohydrin bis(hydroxyphenyl)isopropylidene + excess alpha-glycerol dichlorohydrin

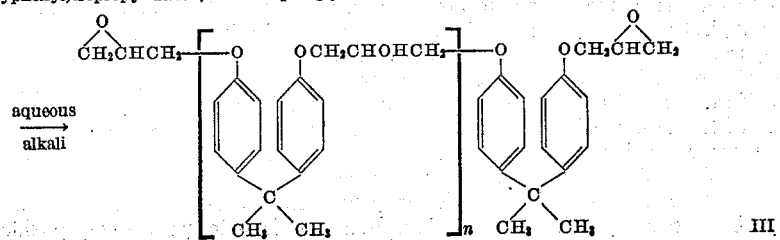

III

As used in the above formulas, $n$ indicates the degree of polymerization depending on the molar ratio of reactants. As can be seen from these formulas, the complex epoxide resins used in this invention contain terminal epoxide groups and alcoholic hydroxyl groups attached to the aliphatic portions of the resin, the latter being formed by the splitting of epoxide groups in the reaction of the same with phenolic hydroxyl groups. Ultimately, the reaction with the phenolic hydroxyl groups of the polyhydric phenols is generally accomplished by means of epoxide groups formed from halohydrins by the loss of hydrogen and halogen as shown by the following equation:

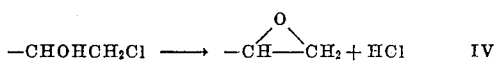

Other epoxide compositions which may be used include the polyepoxide polyesters which may be prepared by esterifying tetrahydrophthalic anhydride with a glycol and epoxidizing the product of the esterification reaction. In the preparation of the polyesters, tetrahydrophthalic acid may also be used as well as the simple esters of tetrahydrophthalic acid such as dimethyl and diethyl esters. There is a tendency with tertiary glycols for dehydration to occur under the conditions used for esterification so that generally the primary and secondary glycols are the most satisfactory in the polyester formation. Glycols which may be used in the preparation of this polyester composition comprise, in general, those glycols having 2 hydroxyl groups attached to separate carbon atoms and free from functional groups which would interfere with the esterification or epoxidation reactions. These glycols include such glycols as ethylene glycol, diethylene glycol, triethylene glycol, tetramethylene glycol, propylene glycol, polyethylene glycol, neopentyl glycol, and hexamethylene glycol. Polyepoxide polyesters may be prepared from these polyesters by epoxidizing the unsaturated portions of the tetrahydrophthalic acid residues in the polyester composition. By properly proportioning reactants in the polyester formation and regulating the epoxidation reaction, polyepoxides having up to 12 or more epoxide groups per molecule may be readily prepared. These polyepoxide polyester compositions as well as their preparation are more fully described in a copending application having Serial No. 503,323 (now forfeited) filed April 22, 1955.

Polyepoxide compositions useful in this invention also include the epoxidized unsaturated natural oil acid esters, including the unsaturated vegetable, animal, and fish oil acid esters made by reacting these materials with various oxidizing agents. Those unsaturated oil acid esters are long chain aliphatic acid esters containing from about 15 to 22 carbon atoms. These acids may be esterified by simple monohydric alcohols such as methyl, ethyl, or decyl alcohol, by polyhydric alcohols such as glycerol, pentaerythritol, polyallyl alcohol, or resinous polyhydric alcohols. Also suitable are the mixed esters of polycarboxylic acids and long chain unsaturated natural oil acids with polyhydric alcohols, such as glycerol and pentaerythritol. These epoxidized oil acid esters may contain more than 1 up to 20 epoxide groups per molecule. The method of epoxidizing these unsaturated oil acid esters consists of treating them with various oxidizing agents, such as the organic peroxides and the peroxy acids, or with one of the various forms of hydrogen peroxide. A typical procedure practiced in the art consists of using hydrogen peroxide in the presence of an organic acid, such as acetic acid and a catalytic material, such as sulfuric acid. More recently epoxidation methods have consisted of replacing the mineral acid catalyst with a sulfonated cation exchange material, such as the sulfonated copolymer of styrene divinylbenzene.

The epoxide compositions which may be used in preparing the compositions of this invention also include aliphatic polyepoxides which may be illustrated by the products obtained by polymerizing allyl glycidyl ether through its unsaturated portion.

The reaction may be carried to give higher polymers than the dimer. Other aliphatic polyepoxides useful in this invention may be illustrated by the poly(epoxyalkyl) ethers derived from polyhydric alcohols. These materials may, in general, be prepared by reacting an aliphatic polyhydric alcohol with an epihalohydrin in the presence of a suitable catalyst and in turn dehydrohalogenating the product to produce the epoxide composition. The production of these epoxides may be illustrated by the reaction of glycerol with epichlorohydrin in the presence of boron trifluoride followed by dehydrohalogenation with sodium aluminate as follows:

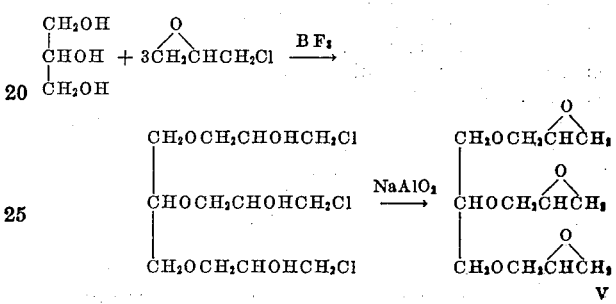

It is to be understood that such reactions do not give pure compounds and that the halohydrins formed and the epoxides derived therefrom are of somewhat varied character depending upon the particular reactants, their proportions, reaction time and temperature. In addition to epoxide groups, the epoxide compositions may be characterized by the presence of hydroxyl groups and halogens. Dehydrohalogenation affects only those hydroxyl groups and halogens which are attached to adjacent carbon atoms. Some halogens may not be removed in this step in the event that the proximate carbinol group has been destroyed by reaction with an epoxide group. These halogens are relatively unreactive and are not to be considered as functional groups in the conversion of the reaction mixtures of this invention. The preparation of a large number of these mixed polyepoxides is described in the Zech patents, U.S. 2,538,072, 2,581,464, and 2,712,000. Still other polyepoxides which have been found to be valuable are such epoxide compositions as diepoxy butane, diglycid ether, and epoxidized polybutadiene.

Immediately following will be a description or illustration of preparations of polyepoxides which will be used in examples of compositions of this invention.

The complex resinous polyepoxides used in the examples and illustrative of the commercially prepared products of this type are the Epon resins marketed by Shell Chemical Corporation. The following table gives the properties of some Epon resins which are prepared by the condensation in the presence of alkali of bis(4-hydroxyphenyl)isopropylidene with a molar excess of epichlorohydrin in varying amounts.

| Epon resin type | Melting point, ° C. | Viscosity [1] (Gardner-Holdt) | Epoxide equivalent | Average molecular weight |
|---|---|---|---|---|
| Epon 864 | 40– 45 | $A_1$–B | 325 | 450 |
| Epon 1001 | 64– 76 | C–G | 480 | 640 |
| Epon 1004 | 95–105 | Q–U | 870 | 1,133 |
| Epon 1007 | 127–133 | Y–$Z_1$ | 1,750 | |
| Epon 1009 | 145–155 | $Z_1$–$Z_3$ | 3,200 | |

[1] Based on 40% nonvolatile in butyl Carbitol at 25° C.

Examples 6 through 8 describe the preparation of typical polyepoxide polyesters.

EXAMPLE 6

*Preparation of polyester from tetrahydrophthalic anhydride and ethylene glycol*

In a 3-necked flask provided with a thermometer, mechanical agitator, and a reflux condenser attached through a water trap was placed a mixture of 3 mols of tetrahydrophthalic anhydride and 2 mols of n-butanol. After melting the tetrahydrophthalic anhydride in the presence of the butanol, 2 mols of ethylene glycol were added. The reaction mixture was gradually heated with agitation to 225° C. at which point a sufficient amount of xylene was added to give refluxing at esterification temperature. The reaction mixture was then heated with continuous agitation at 225–235° C. until an acid value of 4.2 was obtained. This product gave an iodine value of 128.

*Epoxidation of the polyester resin*

In a 3-necked flask provided with a thermometer, a mechanical agitator, and a reflux condenser was placed 107 parts of the dehydrated acid form of a cation exchange resin (Dowex 50–X–8, 50–100 mesh, Dow Chemical Company, a sulfonated styrene-divinylbenzene copolymer containing about 8% divinylbenzene, the percent divinylbenzene serving to control the amount of cross-linkage. The Dowex resins are discussed in publications entitled "Ion Exchange Resins No. 1" and "Ion Exchange Resins No. 2," copyright 1954 by Dow Chemical Company, the publications having form number Sp32–254 and Sp31–354, respectively), and 30 parts glacial acetic acid. The mixture of cation exchange resin and acetic acid was allowed to stand until the resin had completely taken up the acid. To this mixture was added 200 parts of the polyester resin dissolved in an equal weight of xylene. To the continuously agitated reaction mixture was added dropwise over a period of 45 minutes to 1 hour, 75 parts of 50% hydrogen peroxide. The reaction temperature was held at 60° C. requiring the application of some external heat. (In some preparations involving other polyester resins, sufficient exothermic heat is produced during the addition of hydrogen peroxide so that no external heat is required, or even some external cooling may be required.) The reaction was continued at 60° C. until a milliliter sample of the reaction mixture analyzed less than 1 milliliter of 0.1 N sodium thiosulfate in an iodometric determination of hydrogen peroxide. The product was then filtered, finally pressing the cation exchange resin filter cake. The acid value of the total resin solution was 42. The percent nonvolatile of this solution amounting to 400 parts was 50. This 400 parts of solution was thoroughly mixed with 110 parts of the dehydrated basic form of Dowex 1 (an anion exchange resin of the quaternary ammonium type. Dowex 1 is a styrene-divinylbenzene copolymer illustrated by the formula RR'$_3$N$^+$OH$^-$ where R represents the styrene-divinylbenzene matrix and R' is a methyl group, manufactured by the Dow Chemical Company). The resulting mixture was then filtered followed by pressing as much of the solution as possible from the anion exchange resin cake. This product had an acid value of 4.5 and an epoxide equivalent of 288 based on a nonvolatile resin content of 42.0%. The epoxide values as discussed herein were determined by refluxing for 30 minutes a 2-gram sample with 50 milliliters of pyridine hydrochloride in excess pyridine. (The pyridine hydrochloride solution was prepared by adding 20 milliliters of concentrated HCl to a liter of pyridine.) After cooling to room temperature, the sample is then back-titrated with standard alcoholic sodium hydroxide.

EXAMPLE 7

Following the procedure of Example 6, a polyester resin was prepared from 5 mols of tetrahydrophthalic anhydride, 4 mols of diethylene glycol, and 2 mols of n-butanol. This product had an acid value of 5.3 and an iodine value of 107. This polyester resin was epoxidized in the manner previously described to give an epoxide equivalent weight of 371 on the nonvolatile content. The nonvolatile content of this resin solution as prepared was 40.2%.

EXAMPLE 8

The process of Example 6 was followed to obtain a polyester resin from 1.1 mols of tetrahydrophthalic anhydride, 1 mol of 1,4-butanediol and 0.2 mol of n-butanol. The product had an acid value of 8.6. This polyester resin was epoxidized in the same manner to give an epoxide equivalent weight of 292 and an acid value of 5.2 on the nonvolatile content. The nonvolatile content of this resin solution was 41.9%.

Examples 9 through 12 described the preparation of epoxidized vegetable oil acid esters.

EXAMPLE 9

*Epoxidized soyabean oil acid modified alkyd resin* a. *Preparation of alkyd resin.*—To a kettle provided with a condenser was added 290 parts of white refined soyabean oil. While bubbling a continuous stream of nitrogen through this oil the temperature was raised to 250° C., at which temperature 0.23 part of litharge were added and the temperature held at 250° C. for 5 minutes. While holding the temperature above 218° C., 68 parts of technical pentaerythritol were added after which the temperature was raised to 238° C. and held until a mixture of 1 part of the product and 2½ parts of methyl alcohol showed no insolubility (about 15 minutes). At this point 136 parts of phthalic anhydride were added and the temperature gradually raised to 250° C. and held at this temperature for 30 minutes. At this point the condenser was removed from the kettle and the pressure reduced somewhat by attaching to a water aspirator evacuating system. With continuous agitation the mixture was held at 250° C. until the acid value had reached 10.5. At this point the resin was thinned with xylene to 48% nonvolatile content having a viscosity of H (Gardner Bubble Viscosimeter).

b. *Epoxidation of a soyabean oil acid modified alkyd resin.*—In a 3-necked flask provided with a thermometer, a mechanical agitator and a reflux condenser was placed 70 parts of dehydrated acid form of a cation exchange resin (Dowex 50–X–8) and 15 parts glacial acetic acid. The mixture of cation exchange resin and acetic acid was allowed to stand until the resin had completely taken up the acid. To this mixture was added 315 parts of the alkyd resin solution described in the above paragraph and 190 parts of xylene. To the continuously agitated reaction mixture was added dropwise 38 parts of 50% hydrogen peroxide. The reaction temperature was held at 60° C. until a milliliter sample of the reaction mixture analyzed less than one milliliter of 0.1 N sodium thiosulfate in an iodometric determination of hydrogen peroxide. The product was then filtered, finally pressing the cation exchange resin filter cake. The epoxide equivalent on the nonvolatile content was 475.

In order to remove the free acidity from the epoxidized product, 400 parts of the solution were thoroughly mixed with 110 parts of the dehydrated basic form of Dowex 1 (an amine type anion exchange resin). The resulting mixture was then filtered, followed by pressing as much of the solution as possible from the anion exchange resin cake.

EXAMPLE 10

*Epoxidized soyabean oil*

Admex 710, an epoxidized soyabean oil having an equivalent weight to an epoxide of 263, was dissolved in methyl ethyl ketone to a nonvolatile content of 50%. Admex 710, a product of the Archer-Daniels-Midland Company, has an acid value of 1, a viscosity of 3.3 stokes at 25° C. and an average molecular weight of 937.

EXAMPLE 11

Admex 711, an epoxidized soyabean oil having an equivalent weight to an epoxide group of 273.9, was obtained as a commercial product from the Archer-Daniels-Midland Company. It was used directly without solvent.

EXAMPLE 12

Admex 744, an epoxidized butyl oleate ester having an equivalent weight to an epoxide group of 426.8, was obtained from the Archer-Daniels-Midland Company. It was used directly without solvent.

Examples 13 and 14 describe the preparation of simple aliphatic polyepoxides.

EXAMPLE 13

In a reaction vessel provided with a mechanical stirrer and external cooling means were placed 276 parts of glycerol and 828 parts of epichlorohydrin. To this reaction mixture was added 1 part of 45% boron trifluoride ether solution diluted with 9 parts of ether. The reaction mixture was agitated continuously. The temperature rose to 50° C. over a period of 1 hour and 45 minutes at which time external cooling with ice water was applied. The temperature was held between 50 and 75° C. for 1 hour and 20 minutes. To 370 parts of this product in a reaction vessel provided with a mechanical agitator and a reflux condenser was added 900 parts of dioxane and 300 parts of powdered sodium aluminate. With continuous agitation this reaction mixture was gradually heated to 92° C. over a period of 1 hour and 50 minutes, and held at this temperature for 8 hours and 50 minutes. After cooling to room temperature, the inorganic material was removed by filtration. The dioxane and low boiling products were removed by heating the filtrate to 205° C. at 20 mm. pressure to give a pale yellow product. The epoxide equivalent of this product was determined by treating a 1-gram sample with an excess of pyridine containing pyridine hydrochloride (made by adding 20 cc. of concentrated hydrochloric acid per liter of pyridine) at the boiling point for 20 minutes and back-titrating the excess pyridine hydrochloride with 0.1 N sodium hydroxide using phenolphthalein as indicator and considering one HCl as equivalent to one epoxide group. The epoxide equivalent on this product was found to be 152.

EXAMPLE 14

In a 3-necked flask provided with a thermometer, a mechanical agitator, a reflux condenser and a dropping funnel was placed 402 parts of allyl glycidyl ether. With continuous agitation the temperature was raised to 160° C. at which time one part of a solution of methyl ethyl ketone peroxide dissolved in diethyl phthalate to a 60% content was added. The temperature was held at 160–165° C. for a period of 8 hours, adding one part of the methyl ethyl ketone peroxide solution each 5 minutes during this 8-hour period. After the reaction mixture had stood overnight, the volatile ingredients were removed by vacuum distillation. The distillation was started at 19 mm. pressure and a pot temperature of 26° C. and volatile material finally removed at a pressure of 3 mm. and a pot temperature of 50° C. The residual product had a molecular weight of 418, and equivalent weight to epoxide content of 198, the yield amounting to 250 parts.

Two general classes of aldehyde condensates are contemplated for preparing the modified products of this invention, those prepared from ammonia derivatives and those derived from phenols, with the choice being dependent on the end uses and characteristics desired. For instance, if the end use were to be a white enamel, the ammonia derivative-aldehyde condensates would probably be chosen because of their extremely light initial color and their good color retention, the phenols are somewhat darker in color and have a tendency to yellow upon aging. For the most desirable non-polar solvent solubility, the phenol-aldehyde condensates would be the proper choice since the ammonia derivative-aldehyde condensates usually require some butanol and xylol present to give the desirable solubility. For certain applications, the butanol odor is objectionable and at times incompatible with the resin with which it is used. Adhesion to metals also appears to be better in the phenol-aldehyde condensates. From an economic standpoint, the phenol-aldehyde condensates are advantageous, being lower in price.

The aldehyde-ammonia derivative condensation products are formed by the reaction of aldehydes with amines or amides such as urea, thiourea, and their derivatives, melamines and sulfonamides. It is well known that various amines and amides will react with formaldehyde to form aldehyde-amine or aldehyde-amide condensates. A number of derivatives of the amines and amides mentioned are also contemplated herein. Exemplary derivatives are substituted urea, thiourea, or melamine such as the long-chain alkyl-substituted materials which impart oil or organic solvent solubility. Suitable sulfonamides include aromatic mononuclear sulfonamides such as toluene sulfonamide, polynuclear sulfonamides such as naphthalene sulfonamide, sulfonamides of aromatic polynuclear ethers and mono- or polyfunctional sulfonamides. In addition to melamine, other operable ammonia derivatives containing the azide bridge are the amino di- and triazines.

In the condensation of aldehydes with the organic ammonia derivatives, initially the reaction appears to be the addition of aldehyde to the organic ammonia derivative to form primarily intermediate alkylol compounds. These compounds will further condense to form more resinous materials, combining with each other through alkylene bridges formed between the nitrogen atoms of the compounds.

In the alkylol condensate and in the more condensed products of an advanced stage of condensation, there are hydrogen atoms present in the hydroxyl groups which have been formed in the production of the alkylol condensate and which have not been destroyed by further condensation. There are also an appreciable number of hydrogen atoms attached to nitrogen atoms of the amide or amine groups present in the condensation products. These hydrogens contained in the hydroxyl groups and the amide or amine groups are active with respect to epoxide groups and will react therewith in the reaction mixtures of this invention to form complex, crosslinked products.

In general, the condensation products of ammonia derivatives and aldehydes contemplated herein are partial and intermediate reaction or condensation products of aldehydes, particularly formaldehyde, with amines or amides, or mixtures thereof. The reactions which produce such condensation products involve the removal of amino or amido hydrogen atoms from the ammonia derivative. Therefore, it should be understood that an ammonia derivative, in order to be suitable for condensation with an aldehyde, must contain at least one hydrogen atom attached to the nitrogen atom. Fusible materials of varying degrees of condensation may be used with the epoxides and the mixed esters to form the new compositions and reaction products of this invention. Thus, the condensates may be made by various processes known in the art for the manufacture of aldehyde-ammonia derivative resins, resulting in water-soluble, alcohol-soluble or oil-soluble types.

For use herein, the aldehyde-ammonia derivative condensate may be in its monomeric form which is essentially an alkylol or polyalkylol product or it may be highly condensed. It is suitable as long as it is still fusible and is soluble in or compatible with the epoxide composition and the mixed-ester composition with which it is to be reacted.

Many of the commercial products derived from the reaction of urea, thiourea, or melamine with formaldehyde are mixed products made by reacting the formaldehyde with mixtures of these materials. Such composite or mixed reaction products can advantageously be used for reaction with the epoxides and the mixed esters according to the present invention. In addition, many of the present day commerical resins derived from aldehydes and urea, thiourea, or melamine, or a mixture thereof, are prepared in the presence of alcoholic or other solvents which take part in the reaction and become an integral part of the resulting resin composition. This is illustrated by the products prepared in the presence of butyl alcohol in which case the butyl alcohol to some extent condenses with the alkylol groups of the aldehyde condensate to give butyl ether residues as a part of the final composition. Such modified products are also suitable. In some cases it may be desirable to use an ammonia derivative-aldehyde condensate which is completely soluble in a common solvent or a mixture of solvents used to dissolve epoxide and the mixed ester. Solutions prepared in this manner can be applied as a coating and the solvent subsequently evaporated before the main reaction between the epoxide, mixed ester, and condensate takes place.

Examples 15 to 19, inclusive, describe the preparation of typical ammonia derivative-aldehyde condensates suitable for use herein.

EXAMPLE 15

In a 3-liter 3-neck flask provided with a mechanical agitator, a thermometer, and reflux condenser was placed 120 parts of urea, 600 parts of 37% aqueous formaldehyde, and 1040 parts of n-butyl alcohol. With continuous agitation the reaction mixture was heated to reflux temperature and the refluxing continued for a period of 1 hour. At this point a water trap was placed between the reflux condenser and flask and filled with toluene. Distillation was continued until 315 parts of water were removed from the reaction mixture. The resulting mixture was cooled to room temperature, filtered, and 1030 parts of a clear, water-white, syrupy liquid isolated.

EXAMPLE 16

The procedure of preparation including the water removal was the same as that used in Example 15. A mixture of 304 parts of thiourea, 960 parts of 37% aqueous formaldehyde, and 800 parts of n-butyl alcohol was used to give a final yield of 1214 parts of a clear, light amber, syrupy product.

EXAMPLE 17

The procedure of preparation including the removal of water was the same as that used in Example 15. A mixture of 120 parts of urea, 148 parts of thiourea, 950 parts of 37% aqueous formaldehyde, and 800 parts of n-butyl alcohol was used to give a final yield of 1175 parts of a clear, almost colorless, syrupy liquid.

EXAMPLE 18

In a 3-liter 3-neck flask provided with a mechanical agitator, a thermometer, and a reflux condenser was placed 378 parts of melamine, 840 parts of 37% aqueous formaldehyde, and 725 parts of n-butyl alcohol. With continuous agitation the reaction mixture was heated to reflux temperature and the refluxing continued for a period of 30 minutes. At this point a water trap was placed in the distilling column between the flask and the reflux condenser and filled with toluene. The refluxing was continued until a total of 590 parts of water had been removed from the reaction mixture. The product amounting to 1342 parts was a clear, water-white, heavy, syrupy liquid.

EXAMPLE 19

In a 3-liter 3-neck flask provided with a mechanical agitator, a thermometer, and a reflux condenser was placed 1370 parts of p-toluenesulfonamide and 640 parts of 37% aqueous formaldehyde the pH of which had been previously adjusted to 6.0 with potassium acid phthalate and sodium hydroxide. With continuous agitation the reaction mixture was heated to reflux temperature over a period of 40 minutes and the refluxing continued for a period of 15 minutes. At this point the reaction mixture was allowed to cool and the water decanted from the resin. The resin was washed 3 times with warm water and finally dehydrated in vacuum at 30–50 mm. pressure, using a maximum flask temperature of 90° C. to yield 1245 parts of water-white resinous solid.

The second class of condensates suitable for modifying the compositions herein described are those which contain reactive phenolic hydroxyl groups formed by the reaction of phenols and aldehydes. Phenol and formaldehyde react to form a variety of reaction products depending upon the proportions and conditions of reaction. These include products such as phenol alcohols having both phenolic and alcoholic hydroxyl groups, and products of the diphenolmethane type containing phenolic hydroxyl groups only. The condensation of phenol and formaldehyde can be carried out with the use of acid or alkaline condensing agents and in some cases by first combining the aldehyde with an alkali such as ammonia to form hexamethylenetetramine and reacting the latter with the phenol. The phenol-aldehyde resins at an initial or intermediate stage of reaction are intended to be included in the term phenol-aldehyde condensates as used herein.

In general, the phenol-aldehyde condensates should not have their condensation carried so far as to become insoluble and nonreactive. It is preferred in the preparation of the instant compositions that they be used at an intermediate stage or at a stage of reaction such that they contain reactive phenolic hydroxyl groups or both phenolic and alcoholic hydroxyl groups. This is desirable in order to permit a proper blending of the phenol-aldehyde condensate with the polyepoxides and mixed esters for subsequent reaction therewith.

The phenol-aldehyde condensates may be derived from mononuclear phenols, polynuclear phenols, monohydric phenols, or polyhydric phenols. The critical requirement for the condensate is that it be compatible with the polyepoxides and mixed esters or with the two reactants in a solvent used as a reaction medium. The phenol-aldehyde condensate which is essentially a polymethylol phenol rather than a polymer may be used in the preparation of the new phenol-aldehyde, polyepoxide, mixed ester products, or it may be used after further condensation, in which case some of the methylol groups are usually considered to have disappeared in the process of condensation. Various so-called phenolic resins which result from the reaction of phenols and aldehydes, and particularly from common phenols or cresols and formaldehyde, are available as commercial products both of an initial and intermediate character. Such products include resins which are readily soluble in common solvents or readily fusible so that they can be admixed with the epoxides and mixed esters and reacted therewith to form the products of this invention.

In selecting a phenol-aldehyde condensate one may choose either the heat-converting or the permanently fusible type. For example, the formaldehyde reaction products of such phenols as carbolic acid, resorcinol, and 2,2-bis(4-hydroxyphenyl)propane readily convert to infusible, insoluble compositions on the application of heat. On the other hand, some of the para alkylated phenols, as illustrated by p-tert-butylphenol, produce permanently fusible resins on reaction with formaldehyde. Even though fusible condensates are employed, however, insoluble, infusible products result when they are heated in combination with the epoxides and the mixed esters described.

Examples 20 to 22, inclusive, describe the preparation of some of the operable phenol-aldehyde condensates which may be used in combination with the polyepoxides and the mixed esters to form the products herein described.

EXAMPLE 20

*Condensation of Bisphenol A [2,2-bis(4-hydroxyphenyl)-propane] with formaldehyde*

In a 3-liter 3-neck flask provided with a mechanical agitator, a thermometer, and a reflux condenser was placed 912 parts of Bisphenol A, 960 parts of 37% aqueous formaldehyde, and 2.3 parts of oxalic acid. With continuous agitation, the reaction mixture was heated to the reflux temperature and refluxing continued for a period of 1 hour. After permitting the reaction mixture to cool to around 50° C. the water layer was removed by decantation. The phenol-formaldehyde layer was then washed three times with water which in each case was removed by decantation. The last portion of water was removed by distillation at reduced pressure using a water aspirator system which gave pressure around 30-40 mm. The temperature during the removal of this last portion of water ranged from 70–90° C. The product, amounting to 1065 parts, was a clear, heavy, syrupy material.

EXAMPLE 21

*Reaction of p-tertiary butylphenol with formaldehyde*

The procedure of preparation, including the dehydration step, was the same as that used in Example 20. A mixture of 1000 parts of p-tert-butylphenol, 1067 parts of 37% aqueous formaldehyde, and 10 parts of sodium hydroxide was used to give a final yield of 1470 parts of a clear, almost colorless syrupy product.

EXAMPLE 22

*Reaction of phenol with formaldehyde*

Again a reaction procedure including the dehydration step was the same as that used in Example 20. A mixture of 658 parts of phenol, 1400 parts of 37% aqueous formaldehyde, and 6.6 parts of sodium hydroxide was used to give a final yield of 1168 parts of a clear, syrupy product.

In general the polymeric final reaction products of this invention are obtained by heating mixtures comprised of polyepoxides and mixed esters or said compositions modified with aldehyde condensates, with or without the addition of a catalyst. The reaction mixtures convert readily under moderate heating to yield the final reaction products, the preferred temperatures being in the range of about 100–200° C. When a catalyst is employed, shorter heating periods or lower temperatures can usually be employed to bring about conversion. Operable catalysts are the Friedel-Craft type such as boron trifluoride adducts, mineral acids such as $H_2SO_4$, and alkaline salts such as the sodium salts of phenols or alcohols.

The reaction which takes place during the conversion in the reaction mixtures appears complex and it is desired not to be limited by any theoretical explanation of the exact nature involved. However, it seems likely that the reactions include polymerization of the epoxide compositions inter se; ammonia derivative-aldehyde condensates or phenol-aldehyde condensates; reaction of epoxide groups with active hydrogen-containing groups such as methylol-hydroxyl groups, phenolic-hydroxyl groups, and amine or amide hydrogens of the ammonia derivative, all of which take place to some extent simultaneously in forming the final products.

In preparing the new compositions, the polyepoxides and mixed esters and such compositions modified with aldehyde condensates may be used in regulated proportions without the addition of other materials, however, other constituents, such as filling and compounding materials, plasticizers, pigments, etc., may be advantageously admixed with the new compositions in some instances. The method of blending would depend upon the materials and their softening point or the solubility of the materials in a common solvent. For most applications it is possible to regulate proportions and types of reacting ingredients so as to obtain a product having the desired characteristics, the lack of necessity of using added plasticizers being considered one of the most important features of this invention.

The reaction mixtures and the final insoluble, infusible reaction products may be prepared by using varying proportions of mixed ester, polyepoxide and aldehyde condensate. For instance, if relatively flexible final conversion products are desired, they may be advantageously prepared by using an excess of a relatively soft epoxide resin with lesser amounts of a relatively hard aldehyde condensate or by employing an excess of a relatively soft aldehyde condensate with lesser amounts of the harder epoxide resins. Conversely, a harder conversion product could be prepared by using an excess of a relatively hard epoxide resin with lesser amounts of the softer aldehyde condensate or by using an excess of relatively hard aldehyde condensates with lesser amounts of the softer epoxide resins. Similarly, the amounts of mixed ester used may be adjusted to produce variations in hardness of the final conversion products.

It is thus apparent that a wide range of proportions of reactants are operable in the herein described compositions depending largely on the desired characteristics of the final product. It is also true that if a large excess of the mixed ester-aldehyde condensate or the polyepoxide is used, some of the desirable characteristics are impaired. For example, if a large excess of mixed ester is employed, the alkali sensitivity is increased or, alternatively, if a large excess of high molecular weight, complex polyepoxide is used, the alkali resistance is usually increased while the hot water characteristics are damaged because of the hydrophobic property of the polyepoxide, thereby causing whitening of the film. In order to obtain the maximum desirable characteristics, it is therefore customary to use equivalent or near equivalent ratios of the mixed ester to the polyepoxide. For this reason, the 2:1 to 1:2 ratios are preferred. Equivalents as expressed herein refer to the weight of the polyepoxide per epoxide group, in the case of the polyepoxides, and the weight of the mixed ester per phenolic hydroxyl group, in the case of the mixed ester. The aldehyde condensates are employed to make-up from 5-70% of the composition by weight, but it is usually sufficient to use about 10% of the aldehyde condensate on a weight basis, the aldehyde condensates imparting, in most instances, increased hardness, increased water and alkali resistance, acceleration of the conversion and, in many cases, increased flexibility.

The conversion of the reaction mixtures to polymeric products may be carried out with or without the use of solvents depending upon the final results desired. In the preparation of protective coatings, for example, it is usually desirable to apply a product dissolved in a solvent, in which case the composition will give an initial air-dry by mere solvent evaporation and at a subsequent time the dried film may be converted to an infusible or insoluble product by the application of heat. In the preparation of molding and adhesive compositions, however, it is quite desirable to use a composition which contains little or no solvent, the composition being prepared by the molten mixture of the ingredients.

It may also be desirable to partially react a mixture of the mixed ester and polyepoxide or said composition modified with aldehyde condensate terminating the reaction at an intermediate stage wherein the products are still soluble and fusible. This intermediate product can then be further reacted by the application of heat to form an infusible and insoluble final reaction product. Such intermediate products may be useful, for example, in the preparation of protective coatings or impregnating compositions since they may be dissolved in a solvent, applied, and allowed to dry to a tack-free film which is still fusible and then converted by the application of heat to an infusible stage.

The final reaction products of this invention possess a number of outstanding physical properties such as hardness, toughness, and flexibility. These products also generally display outstanding chemical properties including high resistance to oxidation, alkali and solvents. Excellent film forming characteristics may be obtained by proper selection of the mixed ester, aldehyde condensate, and the epoxide composition employed. In addition, mixtures may be prepared wherein the reacting ingredients generally displayed good compatibility for each other, this compatibility being demonstrated by the clarity of the films prepared from the reaction mixtures. The compatibility and plasticity characteristics of these compositions can be readily adjusted by the variation of the hydroxylated or epoxidized long chain acid esters.

A further noteworthy characteristic observed in the final conversion products is their good adhesion to ordinary surfaces including metals, glass, wood, and plastics. The adhesive properties of the products contribute substantially to their usefulness in the preparation of adhesives and coatings. The adhesive characteristics may properly be explained by the fact that the compositions contain a high percentage of polar groups such as ether, ester, and alcoholic and phenolic hydroxyl groups.

Examples 23 to 250, inclusive, illustrate the preparation of insoluble, infusible protective coating films from the mixed esters and polyepoxides or said composition modified with aldehyde condensates. In these preparations of compositions where heat curing is used to form protective coating films, each of the resinous mixed esters was dissolved in methyl isobutyl ketone or butanol to a nonvolatile content of 40–50%. The polyepoxides were similarly dissolved in methyl ethyl ketone or xylene to a nonvolatile content of 40–60%, except in a few instances where the polyepoxide was used at 100% nonvolatile content. In such instances, this is stated in the polyepoxide description. The aldehyde condensates were dissolved in methyl isopropyl ketone or a mixture of methyl isopropyl ketone and butanol to a nonvolatile content of 40–70%. Mixtures of the mixed-ester solutions with the polyepoxides or mixtures of mixed esters, aldehyde condensates with the polyepoxides were found to be stable at room temperature for varying periods of time. Mixtures of the solutions were spread on glass panels with a .002" Bird applicator and the films were baked for periods of 30–90 minutes at 175–200° C. Proportions hereinafter expressed refer to parts by weight and are based on the nonvolatile content of the solution of reactants.

| Ex. No. | Parts of polyepoxide | Parts of diphenolic acid mixed ester | Parts of aldehyde condensate | Parts of catalyst | Baking schedule, min./° C. | Films resistance Boiling water, hr. | 5% aqueous NaOH at 25° C., hr. |
|---|---|---|---|---|---|---|---|
| 23 | 210 Epon 864 | 143 Ex. 1 | | 1.8 sodium ethoxide | 30/200 | 10½ | 60+ |
| 24 | do | 135 Ex. 3 | | 0.7 sodium ethoxide | 30/175 | ½ | 48+ |
| 25 | do | 135 Ex. 3 | | do | 30/200 | 8 | 48+ |
| 26 | do | 115 Ex. 4 | | do | 30/175 | 5 | 48+ |
| 27 | do | 168 Ex. 5 | | 0.9 sodium ethoxide | 30/200 | 16+ | 48+ |
| 28 | 300 Epon 1001 | 140 Ex. 2 | | 1.1 sodium ethoxide | 30/175 | 16+ | 48+ |
| 29 | do | 140 Ex. 2 | | 5.06 DPA sodium salt* | 30/175 | 16+ | 48+ |
| 30 | do | 135 Ex. 3 | | 2.2 sodium ethoxide | 30/150 | 16+ | 48+ |
| 31 | do | 135 Ex. 3 | | do | 30/200 | 16+ | 48+ |
| 32 | 200 Epon 1001 | 115 Ex. 4 | | 3.4 DPA sodium salt | 30/175 | 16+ | 48+ |
| 33 | 360 Epon 1004 | 143 Ex. 1 | | 5.2 DPA sodium salt | 30/175 | 16+ | 48+ |
| 34 | 540 Epon 1004 | 140 Ex. 2 | | 3.4 sodium ethoxide | 30/200 | 16+ | 48+ |
| 35 | do | 140 Ex. 2 | | do | 30/150 | 16+ | 48+ |
| 36 | do | 135 Ex. 3 | | 1.7 sodium ethoxide | 30/175 | 16+ | 48+ |
| 37 | do | 135 Ex. 3 | | 7.0 DPA sodium salt | 30/175 | 16+ | 48+ |
| 38 | do | 115 Ex. 4 | | 1.6 sodium ethoxide | 30/175 | 10 | 48+ |
| 39 | 1050 Epon 1007 | 143 Ex. 1 | | 3.0 sodium ethoxide | 30/175 | 5 | 48+ |
| 40 | do | 140 Ex. 2 | | 2.9 sodium ethoxide | 30/175 | 10 | 48+ |
| 41 | do | 115 Ex. 4 | | 5.8 sodium ethoxide | 30/175 | 16+ | 48+ |
| 42 | do | 168 Ex. 5 | | 2.9 sodium ethoxide | 30/200 | 5 | 48+ |
| 43 | 115 Ex. 6 | 140 Ex. 2 | | 0.6 sodium ethoxide | 30/200 | 20+ | ¼ |
| 44 | 173 Ex. 6 | 140 Ex. 2 | | 3.1 sodium ethoxide | 30/200 | 20+ | 11½ |
| 45 | 173 Ex. 6 | 115 Ex. 5 | | 1.4 sodium ethoxide | 30/200 | 1 | 56+ |
| 46 | 173 Ex. 6 | 136 Ex. 4 | | 3.1 sodium ethoxide | 30/200 | 20+ | ¾ |
| 47 | 173 Ex. 6 | 143 Ex. 1 | | 1.6 sodium ethoxide | 30/200 | 3¾ | ¾ |
| 48 | 173 Ex. 6 | 136 Ex. 3 | | 13.9 g. DPA sodium salt | 30/200 | 20+ | 6 |
| 49 | 133 Ex. 7 | 136 Ex. 3 | | 0.7 sodium ethoxide | 30/200 | 20+ | ¼ |
| 50 | 199 Ex. 7 | 136 Ex. 3 | | 1.8 sodium ethoxide | 30/200 | 20+ | 32 |
| 51 | 199 Ex. 7 | 136 Ex. 3 | | 3.3 sodium ethoxide | 30/200 | 20+ | 32 |
| 52 | 199 Ex. 7 | 115 Ex. 4 | | 1.6 sodium ethoxide | 30/200 | 20+ | 6 |
| 53 | 199 Ex. 7 | 140 Ex. 2 | | 1.7 sodium ethoxide | 30/200 | 20+ | 14 |
| 54 | 199 Ex. 7 | 143 Ex. 1 | | 3.4 sodium ethoxide | 30/200 | 20+ | 1½ |
| 55 | 199 Ex. 7 | 168 Ex. 5 | | 1.8 sodium ethoxide | 30/200 | 20+ | 2½ |
| 56 | 173 Ex. 7 | 168 Ex. 5 | | 3.4 sodium ethoxide | 30/200 | 20+ | 1½ |
| 57 | 199 Ex. 7 | 115 Ex. 4 | | 7.4 DPA sodium salt | 30/200 | 20+ | 56+ |
| 58 | 175 Ex. 8 | 143 Ex. 1 | | 3.2 sodium ethoxide | 30/200 | 20+ | 6 |
| 59 | 175 Ex. 8 | 140 Ex. 2 | | 3.1 sodium ethoxide | 30/200 | 20+ | 8½ |
| 60 | 175 Ex. 8 | 136 Ex. 3 | | 1.5 sodium ethoxide | 30/200 | 2½ | 32 |
| 61 | 160 Ex. 8 | 115 Ex. 4 | | 2.8 sodium ethoxide | 30/200 | 3½ | 56+ |
| 62 | 256 Ex. 12 | 143 Ex. 1 | | 4.0 piperidine | 60/200 | 16+ | ¼ |
| 63 | 157 Ex. 10 | 143 Ex. 1 | | 6.0 piperidine | 60/200 | 16+ | 1 |
| 64 | 308 Ex. 9 | 143 Ex. 1 | | 4.5 piperidine | 60/200 | 16+ | 2 |
| 65 | 164 Ex. 11 | 143 Ex. 1 | | 6.2 piperidine | 60/200 | 16+ | 3 |
| 66 | 157 Ex. 10 | 157 Ex. 2 | | 6.0 piperidine | 60/200 | 16+ | 3 |
| 67 | 256 Ex. 12 | 140 Ex. 2 | | 4.0 piperidine | 60/200 | 16+ | ¼ |
| 68 | 308 Ex. 9 | 140 Ex. 2 | | 4.5 piperidine | 60/200 | 16+ | 10 |
| 69 | 164 Ex. 11 | 140 Ex. 2 | | 3.0 piperidine | 60/200 | 16+ | 2 |
| 70 | 164 Ex. 11 | 140 Ex. 2 | | 6.0 piperidine | 30/200 | 16+ | 3 |
| 71 | 308 Ex. 9 | 136 Ex. 3 | | 4.4 piperidine | 60/200 | 16+ | 2 |
| 72 | 157 Ex. 10 | 136 Ex. 3 | | 5.8 piperidine | 60/200 | 16+ | ½ |
| 73 | 256 Ex. 12 | 136 Ex. 3 | | 7.8 piperidine | 60/200 | 16+ | ¼ |

+Tests were stopped with no indication of film failure.
*DPA-4,4-bis(4-hydroxyphenyl)pentanoic acid.

| Ex. No. | Parts of polyepoxide | Parts of diphenolic acid mixed ester | Parts of aldehyde condensate | Parts of catalyst | Baking schedule, min./° C. | Films resistance Boiling water, hr. | Films resistance 5% aqueous NaOH at 25° C., hr. |
|---|---|---|---|---|---|---|---|
| 74 | 164 Ex. 11 | 136 Ex. 3 | | 6.0 piperidine | 60/200 | 16+ | 1 |
| 75 | 157 Ex. 10 | 115 Ex. 4 | | 2.7 piperidine | 30/200 | 16+ | 4 |
| 76 | 157 Ex. 10 | 115 Ex. 4 | | 5.4 piperidine | 30/200 | 16+ | 6½ |
| 77 | 256 Ex. 12 | 115 Ex. 4 | | 3.7 piperidine | 30/200 | 16+ | ¼ |
| 78 | 308 Ex. 9 | 115 Ex. 4 | | 4.2 piperidine | 30/200 | 16+ | 13½ |
| 79 | 164 Ex. 11 | 115 Ex. 4 | | 2.8 piperidine | 30/200 | 16+ | 4½ |
| 80 | 157 Ex. 10 | 168 Ex. 5 | | 6.4 piperidine | 60/200 | 16+ | ¾ |
| 81 | 308 Ex. 9 | 168 Ex. 5 | | 4.8 piperidine | 30/200 | 16+ | 2 |
| 82 | 308 Ex. 9 | 168 Ex. 5 | | 9.6 piperidine | 30/200 | 16+ | 2 |
| 83 | 164 Ex. 11 | 168 Ex. 5 | | 6.6 piperidine | 60/200 | 16+ | 2 |
| 84 | 60 Ex. 13 | 143 Ex. 1 | | | 60/200 | 13+ | ½ |
| 85 | 90 Ex. 13 | 135 Ex. 3 | | 0.6 sodium ethoxide | 30/200 | 16+ | 3½ |
| 86 | 90 Ex. 13 | 140 Ex. 2 | | do | 30/200 | 16+ | ½ |
| 87 | 90 Ex. 13 | 115 Ex. 4 | | | 60/200 | 13+ | 1 |
| 88 | 90 Ex. 13 | 115 Ex. 4 | | 0.6 sodium ethoxide | 30/175 | 5 | 2½ |
| 89 | 90 Ex. 13 | 143 Ex. 1 | | do | 30/200 | 16+ | ½ |
| 90 | 90 Ex. 13 | 136 Ex. 3 | | 2.3 BF₃ piperidine | 30/200 | 8+ | ½ |
| 91 | 121 Ex. 14 | 143 Ex. 1 | | 2.6 sodium ethoxide | 30/200 | 8+ | 8 |
| 92 | 81 Ex. 14 | 143 Ex. 1 | | 2.2 sodium ethoxide | 30/200 | 8+ | 24 |
| 93 | 121 Ex. 14 | 140 Ex. 2 | | 2.6 sodium ethoxide | 30/200 | 8+ | 48+ |
| 94 | 121 Ex. 14 | 140 Ex. 2 | | 1.3 sodium ethoxide | 30/200 | 8+ | 48+ |
| 95 | 121 Ex. 14 | 136 Ex. 3 | | 2.6 sodium ethoxide | 30/200 | 8+ | 48+ |
| 96 | 81 Ex. 14 | 136 Ex. 3 | | 2.2 sodium ethoxide | 30/200 | 8+ | 48+ |
| 97 | 121 Ex. 14 | 115 Ex. 4 | | 2.4 sodium ethoxide | 30/200 | 1+ | 48+ |
| 98 | 81 Ex. 14 | 115 Ex. 4 | | 0.9 sodium ethoxide | 30/200 | 8+ | 23+ |
| 99 | 121 Ex. 14 | 168 Ex. 5 | | 3.0 sodium ethoxide | 30/200 | 8+ | 3 |
| 100 | 210 Epon 864 | 143 Ex. 1 | 210 Ex. 22 | 1.8 sodium ethoxide | 30/200 | 16+ | 48+ |
| 101 | 540 Epon 1004 | 143 Ex. 1 | 270 Ex. 20 | 3.4 sodium ethoxide | 30/200 | 16+ | 48+ |
| 102 | 1050 Epon 1007 | 143 Ex. 1 | 525 Ex. 21 | 3.0 sodium ethoxide | 30/200 | 16+ | 48+ |
| 103 | 300 Epon 1001 | 140 Ex. 2 | 150 Ex. 22 | 1.1 sodium ethoxide | 30/200 | 16+ | 48+ |
| 104 | 105 Epon 864 | 140 Ex. 2 | 105 Ex. 22 | 1.2 sodium ethoxide | 30/200 | 16+ | 48+ |
| 105 | 300 Epon 1001 | 140 Ex. 2 | 300 Ex. 20 | 1.1 sodium ethoxide | 30/200 | 16+ | 48+ |
| 106 | 1200 Epon 1009 | 140 Ex. 2 | 300 Ex. 21 | 6.7 sodium ethoxide | 30/200 | 16+ | 48+ |
| 107 | 360 Epon 1004 | 136 Ex. 3 | 90 Ex. 22 | 2.4 sodium ethoxide | 30/200 | 16+ | 48+ |
| 108 | 140 Epon 864 | 136 Ex. 3 | 140 Ex. 20 | 0.7 sodium ethoxide | 30/200 | 16+ | 48+ |
| 109 | 540 Epon 1004 | 136 Ex. 3 | 540 Ex. 21 | 1.7 sodium ethoxide | 30/200 | 16+ | 48+ |
| 110 | 150 Epon 1001 | 136 Ex. 3 | 38 Ex. 21 | 1.4 sodium ethoxide | 30/200 | 16+ | 48+ |
| 111 | 1200 Epon 1009 | 115 Ex. 4 | 300 Ex. 22 | 6.6 sodium ethoxide | 30/200 | 105+ | 48+ |
| 112 | 1050 Epon 1007 | 115 Ex. 4 | 260 Ex. 20 | 5.8 sodium ethoxide | 30/200 | 16+ | 48+ |
| 113 | 210 Epon 864 | 115 Ex. 4 | 105 Ex. 21 | 0.7 sodium ethoxide | 30/200 | 16+ | 48+ |
| 114 | 700 Epon 1007 | 168 Ex. 5 | 175 Ex. 20 | 2.3 sodium ethoxide | 30/200 | 16+ | 48+ |
| 115 | 360 Epon 1004 | 168 Ex. 5 | 280 Ex. 21 | 1.3 sodium ethoxide | 30/200 | 16+ | 48+ |
| 116 | 143 Ex. 1 | 164 Ex. 8 | 164 Ex. 22 | 3.1 sodium ethoxide | 60/200 | 8+ | ½ |
| 117 | 143 Ex. 1 | 199 Ex. 7 | 149 Ex. 20 | 1.7 sodium ethoxide | 60/200 | 16+ | 6 |
| 118 | 143 Ex. 1 | 115 Ex. 6 | 57 Ex. 21 | 1.2 sodium ethoxide | 30/200 | 16+ | 48+ |
| 119 | 140 Ex. 2 | 199 Ex. 7 | 149 Ex. 20 | 3.4 sodium ethoxide | 30/200 | 11+ | 3 |
| 120 | 140 Ex. 2 | 164 Ex. 8 | 164 Ex. 20 | 3.0 sodium ethoxide | 30/200 | 16+ | 48+ |
| 121 | 140 Ex. 2 | 133 Ex. 7 | 67 Ex. 21 | 2.7 sodium ethoxide | 30/200 | 16+ | 48+ |
| 122 | 136 Ex. 3 | 173 Ex. 6 | 86 Ex. 22 | 1.5 sodium ethoxide | 30/200 | 8+ | 4½ |
| 123 | 136 Ex. 3 | 133 Ex. 7 | 100 Ex. 20 | 2.7 sodium ethoxide | 30/200 | 16+ | ¼ |
| 124 | 136 Ex. 3 | 164 Ex. 8 | 164 Ex. 21 | 1.5 sodium ethoxide | 30/200 | 16+ | 48+ |
| 125 | 115 Ex. 4 | 109 Ex. 8 | 27 Ex. 22 | 1.1 sodium ethoxide | 30/200 | 16+ | 1 |
| 126 | 115 Ex. 4 | 109 Ex. 8 | 50 Ex. 20 | 2.2 sodium ethoxide | 30/200 | 16+ | 48+ |
| 127 | 115 Ex. 4 | 173 Ex. 6 | 173 Ex. 21 | 2.9 sodium ethoxide | 30/200 | 16+ | 48+ |
| 128 | 84 Ex. 5 | 86 Ex. 6 | 86 Ex. 20 | 1.7 sodium ethoxide | 30/200 | 16+ | ½ |
| 129 | 84 Ex. 5 | 100 Ex. 7 | 100 Ex. 21 | 1.8 sodium ethoxide | 30/200 | 16+ | 48+ |
| 130 | 143 Ex. 1 | 157 Ex. 10 | 157 Ex. 22 | 3.0 BF₃ piperidine | 60/200 | 16+ | 2 |
| 131 | 143 Ex. 1 | 164 Ex. 11 | 122 Ex. 20 | 3.1 BF₃ piperidine | 60/200 | 16+ | 2 |
| 132 | 143 Ex. 1 | 308 Ex. 9 | 154 Ex. 21 | 4.5 BF₃ piperidine | 30/200 | 16+ | 48+ |
| 133 | 140 Ex. 2 | 164 Ex. 11 | 82 Ex. 22 | 3.0 BF₃ piperidine | 60/200 | 4+ | 1 |
| 134 | 140 Ex. 2 | 157 Ex. 10 | 117 Ex. 20 | do | 60/200 | 16+ | 1 |
| 135 | 140 Ex. 2 | 256 Ex. 12 | 192 Ex. 21 | 4.0 BF₃ piperidine | 30/200 | 16+ | 48+ |
| 136 | 136 Ex. 3 | 164 Ex. 11 | 164 Ex. 22 | 3.0 BF₃ piperidine | 60/200 | 16+ | 1 |
| 137 | 136 Ex. 3 | 308 Ex. 9 | 251 Ex. 20 | 4.4 BF₃ piperidine | 30/200 | 15+ | 1 |
| 138 | 136 Ex. 3 | 157 Ex. 10 | 79 Ex. 21 | 2.9 BF₃ piperidine | 60/200 | 4 | 48+ |
| 139 | 115 Ex. 4 | 256 Ex. 12 | 64 Ex. 22 | 3.7 BF₃ piperidine | 30/260 | 16+ | ¼ |
| 140 | 115 Ex. 4 | 150 Ex. 10 | 79 Ex. 20 | 2.7 BF₃ piperidine | 30/200 | 16+ | ½ |
| 141 | 115 Ex. 4 | 164 Ex. 11 | 41 Ex. 21 | 2.8 BF₃ piperidine | 60/200 | 7 | 20 |
| 142 | 84 Ex. 5 | 154 Ex. 9 | 39 Ex. 22 | 2.4 BF₃ piperidine | 60/200 | 4 | 1 |
| 143 | 84 Ex. 5 | 128 Ex. 12 | 128 Ex. 20 | 2.1 BF₃ piperidine | 30/200 | 16+ | 1 |
| 144 | 84 Ex. 5 | 79 Ex. 10 | 79 Ex. 21 | 1.6 BF₃ piperidine | 30/200 | 8 | 29 |
| 145 | 143 Ex. 1 | 90 Ex. 13 | 45 Ex. 22 | 0.5 sodium ethoxide | 30/200 | 16+ | 2 |
| 146 | 143 Ex. 1 | 121 Ex. 14 | 91 Ex. 20 | 2.6 sodium ethoxide | 30/200 | 12+ | 6½ |
| 147 | 143 Ex. 1 | 81 Ex. 14 | 81 Ex. 21 | 2.2 sodium ethoxide | 30/200 | 12+ | 96+ |
| 148 | 140 Ex. 2 | 121 Ex. 14 | 20 Ex. 22 | 2.6 sodium ethoxide | 30/200 | 8+ | 96+ |
| 149 | 140 Ex. 2 | 90 Ex. 13 | 90 Ex. 20 | 1.1 sodium ethoxide | 30/200 | 16+ | 6½ |
| 150 | 140 Ex. 2 | 121 Ex. 14 | 60.5 Ex. 21 | 1.3 sodium ethoxide | 30/200 | 16+ | 96+ |
| 151 | 136 Ex. 3 | 81 Ex. 14 | 61 Ex. 22 | 2.2 sodium ethoxide | 30/200 | 7+ | 26 |
| 152 | 136 Ex. 3 | 121 Ex. 14 | 61 Ex. 20 | 2.6 sodium ethoxide | 30/200 | 12+ | 96+ |
| 153 | 136 Ex. 3 | 90 Ex. 13 | 90 Ex. 21 | 0.6 sodium ethoxide | 30/200 | 16+ | 96+ |
| 154 | 115 Ex. 4 | 81 Ex. 14 | 81 Ex. 22 | 0.9 sodium ethoxide | 30/200 | 16+ | 96+ |
| 155 | 115 Ex. 4 | 90 Ex. 13 | 67.5 Ex. 20 | 1.0 sodium ethoxide | 30/200 | 16+ | 6½ |
| 156 | 115 Ex. 4 | 121 Ex. 14 | 60.5 Ex. 21 | 2.4 sodium ethoxide | 30/200 | 13+ | 28 |
| 157 | 84 Ex. 5 | 45 Ex. 13 | 22.5 Ex. 22 | 0.25 sodium ethoxide | 30/200 | 16+ | 1 |
| 158 | 84 Ex. 5 | 45 Ex. 13 | 45 Ex. 22 | do | 30/200 | 16+ | 5 |
| 159 | 84 Ex. 5 | 60 Ex. 14 | 45 Ex. 21 | 1.5 sodium ethoxide | 30/200 | 7+ | 32 |
| 160 | 210 Epon 864 | 143 Ex. 1 | 210 Ex. 15 | 1.8 sodium ethoxide | 30/200 | 16+ | 48+ |
| 161 | 540 Epon 1004 | 143 Ex. 1 | 270 Ex. 16 | 3.4 sodium ethoxide | 30/200 | 16+ | 48+ |
| 162 | 1050 Epon 1007 | 143 Ex. 1 | 525 Ex. 17 | 3.0 sodium ethoxide | 30/200 | 16+ | 48+ |
| 163 | 300 Epon 1001 | 143 Ex. 1 | 150 Ex. 18 | 1.1 sodium ethoxide | 30/200 | 16+ | 48+ |
| 164 | do | 143 Ex. 1 | 300 Ex. 19 | do | 30/200 | 16+ | 48+ |
| 165 | do | 140 Ex. 2 | 150 Ex. 15 | do | 30/200 | 15+ | 48+ |
| 166 | 105 Epon 864 | 140 Ex. 2 | 105 Ex. 15 | 1.2 sodium ethoxide | 30/200 | 15+ | 48+ |
| 167 | 300 Epon 1001 | 140 Ex. 2 | 150 Ex. 16 | 1.1 sodium ethoxide | 30/200 | 16+ | 48+ |
| 168 | 1200 Epon 1009 | 140 Ex. 2 | 300 Ex. 17 | 6.7 sodium ethoxide | 30/200 | 16+ | 48+ |
| 169 | 360 Epon 1004 | 140 Ex. 2 | 90 Ex. 18 | 2.4 sodium ethoxide | 30/200 | 16+ | 48+ |
| 170 | 105 Epon 864 | 140 Ex. 2 | 105 Ex. 19 | 1.2 sodium ethoxide | 30/200 | 15 | 48+ |
| 171 | 360 Epon 1004 | 136 Ex. 3 | 90 Ex. 15 | 2.4 sodium ethoxide | 30/200 | 16+ | 48+ |
| 172 | 140 Epon 864 | 136 Ex. 3 | 140 Ex. 16 | 0.7 sodium ethoxide | 30/200 | 16+ | 48+ |
| 173 | 540 Epon 1004 | 136 Ex. 3 | 540 Ex. 17 | 1.7 sodium ethoxide | 30/200 | 16+ | 48+ |

+Tests were stopped with no indication of film failure.

| Ex. No. | Parts of polyepoxide | Parts of diphenolic acid mixed ester | Parts of aldehyde condensate | Parts of catalyst | Baking schedule, min./° C. | Films resistance Boiling water, hr. | Films resistance 5% aqueous NaOH at 25 C., hr. |
|---|---|---|---|---|---|---|---|
| 174 | 1200 Epon 1009 | 136 Ex. 3 | 1200 Ex. 18 | 6.6 sodium ethoxide | 30/200 | 16+ | 48+ |
| 175 | 140 Epon 864 | 136 Ex. 3 | 140 Ex. 19 | 0.7 sodium ethoxide | 30/200 | 15+ | 48+ |
| 176 | 1200 Epon 1009 | 115 Ex. 4 | 1200 Ex. 15 | 6.6 sodium ethoxide | 30/200 | 16+ | 48+ |
| 177 | 1050 Epon 1007 | 115 Ex. 4 | 1050 Ex. 16 | 5.8 sodium ethoxide | 30/200 | 16+ | 48+ |
| 178 | 45 Epon 864 | 115 Ex. 4 | 45 Ex. 17 | 0.7 sodium ethoxide | 30/200 | 16+ | 48+ |
| 179 | 143 Ex. 1 | 164 Ex. 8 | 41 Ex. 15 | 3.1 sodium ethoxide | 30/200 | 8+ | 20 |
| 180 | 143 Ex. 1 | 109 Ex. 8 | 54 Ex. 16 | 1.3 sodium ethoxide | 30/200 | 16+ | 2 |
| 181 | 143 Ex. 1 | 115 Ex. 6 | 115 Ex. 17 | 1.2 sodium ethoxide | 30/200 | 16+ | 4 |
| 182 | 143 Ex. 1 | 199 Ex. 7 | 149 Ex. 18 | 3.4 sodium ethoxide | 30/200 | 16+ | 20 |
| 183 | 143 Ex. 1 | 199 Ex. 7 | 199 Ex. 19 | 1.7 sodium ethoxide | 30/200 | 16+ | 48+ |
| 184 | 140 Ex. 2 | 173 Ex. 6 | 86 Ex. 15 | 1.5 sodium ethoxide | 30/200 | 8+ | 48+ |
| 185 | 140 Ex. 2 | 164 Ex. 8 | 41 Ex. 16 | 3.0 sodium ethoxide | 30/200 | 8+ | 2½ |
| 186 | 140 Ex. 2 | 199 Ex. 7 | 149 Ex. 17 | 3.4 sodium ethoxide | 30/200 | 16+ | 4 |
| 187 | 140 Ex. 2 | 199 Ex. 7 | 49 Ex. 18 | do | 30/200 | 16+ | 8 |
| 188 | 140 Ex. 2 | 173 Ex. 6 | 130 Ex. 19 | 1.3 sodium ethoxide | 30/200 | 16+ | 48+ |
| 189 | 136 Ex. 3 | 109 Ex. 8 | 109 Ex. 15 | 1.2 sodium ethoxide | 30/200 | 11½+ | 48+ |
| 190 | 136 Ex. 3 | 133 Ex. 7 | 100 Ex. 16 | 2.7 sodium ethoxide | 30/200 | 16+ | 2 |
| 191 | 136 Ex. 3 | 164 Ex. 8 | 82 Ex. 17 | 1.5 sodium ethoxide | 30/200 | 11½+ | 6½ |
| 192 | 136 Ex. 3 | 173 Ex. 6 | 86 Ex. 18 | do | 30/200 | 11½+ | ½ |
| 193 | 136 Ex. 3 | 199 Ex. 7 | 199 Ex. 19 | 3.3 sodium ethoxide | 30/200 | 16+ | 1 |
| 194 | 115 Ex. 4 | 199 Ex. 7 | 149 Ex. 15 | 1.5 sodium ethoxide | 30/200 | 16+ | 4 |
| 195 | 115 Ex. 4 | 173 Ex. 6 | 173 Ex. 16 | 2.9 sodium ethoxide | 30/200 | 16+ | 20 |
| 196 | 115 Ex. 4 | 133 Ex. 7 | 67 Ex. 17 | 1.3 sodium ethoxide | 30/200 | 16+ | 2½ |
| 197 | 115 Ex. 4 | 109 Ex. 8 | 109 Ex. 18 | 1.1 sodium ethoxide | 30/200 | 16+ | 6½ |
| 198 | 115 Ex. 4 | 115 Ex. 6 | 86 Ex. 19 | 2.3 sodium ethoxide | 30/200 | 8+ | 27 |
| 199 | 84 Ex. 5 | 100 Ex. 7 | 100 Ex. 16 | 1.8 sodium ethoxide | 30/200 | 16+ | 1 |
| 200 | 84 Ex. 5 | 86 Ex. 6 | 65 Ex. 17 | 1.7 sodium ethoxide | 30/200 | 8+ | 8 |
| 201 | 84 Ex. 5 | 83 Ex. 8 | 83 Ex. 19 | do | 30/200 | 16+ | 3 |
| 202 | 143 Ex. 1 | 157 Ex. 10 | 157 Ex. 15 | 3.0 BF₃ piperidine | 60/200 | 16+ | 48+ |
| 203 | 143 Ex. 1 | 308 Ex. 9 | 154 Ex. 16 | 4.5 BF₃ piperidine | 60/200 | 9 | 2 |
| 204 | 143 Ex. 1 | 110 Ex. 11 | 27½ Ex. 17 | 2.5 BF₃ piperidine | 60/200 | 7 | 1 |
| 205 | 143 Ex. 1 | 256 Ex. 12 | 128 Ex. 18 | 4.0 BF₃ piperidine | 60/200 | 16+ | 3 |
| 206 | 143 Ex. 1 | 164 Ex. 11 | 41 Ex. 19 | 3.1 BF₃ piperidine | 60/200 | 16+ | 20 |
| 207 | 140 Ex. 2 | 308 Ex. 9 | 77 Ex. 15 | 4.5 BF₃ piperidine | 60/200 | 16+ | 20 |
| 208 | 140 Ex. 2 | 157 Ex. 10 | 118 Ex. 16 | 6.0 BF₃ piperidine | 60/200 | 16+ | 45 |
| 209 | 140 Ex. 2 | 164 Ex. 11 | 82 Ex. 17 | 3.0 BF₃ piperidine | 60/200 | 16+ | 24 |
| 210 | 140 Ex. 2 | 308 Ex. 9 | 231 Ex. 18 | 9.0 BF₃ piperidine | 60/200 | 16+ | 1 |
| 211 | 140 Ex. 2 | 256 Ex. 12 | 192 Ex. 19 | 4.0 BF₃ piperidine | 60/200 | 7 | 20 |
| 212 | 136 Ex. 3 | 199 Ex. 9 | 199 Ex. 15 | 6.8 BF₃ piperidine | 60/200 | 16+ | 5 |
| 213 | 136 Ex. 3 | 164 Ex. 11 | 164 Ex. 16 | 3.0 BF₃ piperidine | 60/200 | 16+ | 4 |
| 214 | 136 Ex. 3 | 157 Ex. 10 | 785 Ex. 17 | 2.9 BF₃ piperidine | 60/200 | 16+ | 2 |
| 215 | 136 Ex. 3 | 256 Ex. 12 | 256 Ex. 18 | 3.9 BF₃ piperidine | 60/200 | 16+ | 48 |
| 216 | 136 Ex. 3 | 308 Ex. 9 | 152 Ex. 19 | 4.4 BF₃ piperidine | 60/200 | 16+ | 4 |
| 217 | 115 Ex. 4 | 164 Ex. 11 | 123 Ex. 15 | 2.8 BF₃ piperidine | 60/200 | 16+ | 48+ |
| 218 | 115 Ex. 4 | 308 Ex. 9 | 77 Ex. 16 | 4.2 BF₃ piperidine | 60/200 | 16+ | 20 |
| 219 | 115 Ex. 4 | 256 Ex. 12 | 256 Ex. 17 | 3.7 BF₃ piperidine | 60/200 | 16+ | 2 |
| 220 | 115 Ex. 4 | 157 Ex. 10 | 78.5 Ex. 18 | 2.7 BF₃ piperidine | 60/200 | 16+ | 1 |
| 221 | 115 Ex. 4 | 256 Ex. 12 | 256 Ex. 19 | 7.4 BF₃ piperidine | 60/200 | 16+ | 3 |
| 222 | 84 Ex. 5 | 128 Ex. 12 | 64 Ex. 15 | 1.1 BF₃ piperidine | 60/200 | 16+ | 8 |
| 223 | 84 Ex. 5 | 82 Ex. 11 | 82 Ex. 16 | 1.7 BF₃ piperidine | 60/200 | 16+ | 20 |
| 224 | 84 Ex. 5 | 154 Ex. 9 | 116 Ex. 17 | 4.8 BF₃ piperidine | 60/200 | 16+ | 1 |
| 225 | 84 Ex. 5 | 78 Ex. 10 | 78 Ex. 19 | 1.6 BF₃ piperidine | 60/200 | 16+ | 5 |
| 226 | 143 Ex. 1 | 90 Ex. 13 | 23 Ex. 15 | 0.5 sodium ethoxide | 30/200 | 16+ | 6 |
| 227 | 143 Ex. 1 | 60 Ex. 13 | 45 Ex. 16 | 1.0 sodium ethoxide | 30/200 | 16+ | 48 |
| 228 | 143 Ex. 1 | 81 Ex. 14 | 81 Ex. 17 | 2.2 sodium ethoxide | 30/200 | 16+ | 6 |
| 229 | 143 Ex. 1 | 90 Ex. 13 | 22.5 Ex. 18 | 1.0 sodium ethoxide | 30/200 | 16+ | 3 |
| 230 | 143 Ex. 1 | 81 Ex. 14 | 41 Ex. 19 | 2.2 sodium ethoxide | 30/200 | 16+ | 8 |
| 231 | 140 Ex. 2 | 90 Ex. 13 | 45 Ex. 15 | 1.0 sodium ethoxide | 30/200 | 16+ | 8 |
| 232 | 140 Ex. 2 | 90 Ex. 13 | 22.5 Ex. 16 | 1.1 sodium ethoxide | 30/200 | 16+ | 16 |
| 233 | 140 Ex. 2 | 90 Ex. 13 | 68 Ex. 17 | do | 30/200 | 16+ | 56+ |
| 234 | 140 Ex. 2 | 121 Ex. 14 | 61 Ex. 18 | 1.3 sodium ethoxide | 30/200 | 5+ | 8 |
| 235 | 140 Ex. 2 | 121 Ex. 14 | 91 Ex. 19 | do | 30/200 | 16+ | 56+ |
| 236 | 136 Ex. 3 | 81 Ex. 14 | 61 Ex. 15 | 2.2 sodium ethoxide | 30/200 | 16+ | 56+ |
| 237 | 136 Ex. 3 | 121 Ex. 14 | 121 Ex. 16 | 2.6 sodium ethoxide | 30/200 | 16+ | 34 |
| 238 | 136 Ex. 3 | 90 Ex. 13 | 45 Ex. 17 | 0.6 sodium ethoxide | 30/200 | 16+ | 56+ |
| 239 | 136 Ex. 3 | 121 Ex. 14 | 91 Ex. 18 | 2.6 sodium ethoxide | 30/200 | 16+ | 3 |
| 240 | 136 Ex. 3 | 90 Ex. 13 | 90 Ex. 19 | 1.2 sodium ethoxide | 30/200 | 5+ | 34 |
| 241 | 115 Ex. 4 | 121 Ex. 14 | 121 Ex. 15 | 2.4 sodium ethoxide | 30/200 | 16+ | 32 |
| 242 | 115 Ex. 4 | 90 Ex. 13 | 45 Ex. 16 | 1.0 sodium ethoxide | 30/200 | 5+ | 56+ |
| 243 | 115 Ex. 4 | 121 Ex. 14 | 91 Ex. 17 | 2.4 sodium ethoxide | 30/200 | 16+ | 16 |
| 244 | 115 Ex. 4 | 90 Ex. 13 | 90 Ex. 18 | 1.0 sodium ethoxide | 30/200 | 16+ | 5 |
| 245 | 115 Ex. 4 | 90 Ex. 13 | 45 Ex. 19 | do | 30/200 | 5+ | 16 |
| 246 | 84 Ex. 5 | 60 Ex. 14 | 121 Ex. 15 | 1.5 sodium ethoxide | 30/200 | 16+ | 48 |
| 247 | 84 Ex. 5 | 60 Ex. 14 | 30 Ex. 16 | do | 30/200 | 16+ | 7 |
| 248 | 84 Ex. 5 | 45 Ex. 13 | 45 Ex. 17 | 0.5 sodium ethoxide | 30/200 | 16+ | 3 |
| 249 | 84 Ex. 5 | 45 Ex. 13 | 45 Ex. 19 | 2.5 sodium ethoxide | 30/200 | 16+ | 48+ |
| 250 | 300 Epon 1001 | 143 Ex. 1 | | 1.1 sodium ethoxide | 30/175 | 16+ | 48+ |

+Tests were stopped with no indication of film failure.

It should be appreciated that while there are above disclosed but a limited number of embodiments of this invention, it is possible to produce still other embodiments without departing from the inventive concept herein disclosed.

It is claimed and desired to secure by Letters Patent:

1. A composition of matter comprising the condensation product obtained by heating (A) a polyhydric phenol which is the ester of (1) a pentanoic acid consisting essentially of 4,4-bis(4-hydroxyaryl)pentanoic acid wherein the hydroxyaryl radical is a hydroxyphenyl radical and is free from substituents other than alkyl groups of from 1-5 carbon atoms and (2) an ester of an aliphatic hydrocarbon alcohol and an aliphatic monocarboxylic acid of from about 10-36 carbon atoms with said acid having in addition to the carboxyl radical at least one radical selected from the group consisting of hydroxyl and oxirane radicals, wherein said components (1) and (2) are chemically bonded through the esterification of the carboxyl group of (1) with at least one of said hydroxyl and oxirane radicals of (2), and (B) a polyepoxide containing an average of more than one oxirane group per molecule wherein said polyepoxide is composed of the elements carbon, hydrogen and oxygen and having oxygen present only in the groups selected from the group consisting of —OH, —COO—, ethereal oxygen and oxirane groups; wherein said polyepoxide (B) reacts with the phenolic groups of said polyhydric phenol (A).

2. The composition of matter as described in claim 1 wherein the pentanoic acid of (A) consists essentially of 4,4-bis(4-hydroxyaryl)-pentanoic acid wherein the hydroxyaryl radical is a hydroxyphenyl radical and is free from substituents other than alkyl groups of one carbon atom.

3. The composition of matter as described in claim 1 wherein the pentanoic acid of (A) is 4,4 bis(4-hydroxyphenyl)pentanoic acid.

4. The composition of matter as described in claim 3 wherein (B) is a polyglycidyl ether of a member of the group consisting of polyhydric phenols and polyhydric alcohols.

5. The composition of matter as described in claim 3 wherein (B) is a polyepoxy polyester of tetrahydrophthalic acid and a glycol wherein the epoxy oxygen bridges adjacent carbon atoms on the tetrahydrophthalic acid moiety.

6. The composition of matter as described in claim 3 wherein (B) is an aliphatic polyepoxide, said polyepoxide having only hydroxyl groups in addition to oxirane groups.

7. The composition of matter comprising the condensation product obtained by heating (A) a polyhydric phenol which is the ester of (1) a pentanoic acid consisting essentially of 4,4-bis(4-hydroxyaryl)pentanoic acid wherein the hydroxyaryl radical is a hydroxyphenyl radical and is free from substituents other than alkyl groups of from 1-5 carbon atoms and (2) an ester of an aliphatic alcohol hydrocarbon and an aliphatic monocarboxylic acid of from about 10-36 carbon atoms with said acid having in addition to the carboxyl radical at least one radical selected from the group consisting of hydroxyl and oxirane radicals, wherein said components (1) and (2) are chemically bonded through the esterification of the carboxyl group of (1) with at least one of said hydroxyl and oxirane radicals of (2), (B) a polyepoxide containing an average of more than one oxirane group per molecule wherein said polyepoxide is composed of the elements carbon, hydrogen and oxygen and having oxygen present only in the groups selected from the group consisting of —OH, —COO—, ethereal oxygen and oxirane groups; wherein said polyepoxide (B) reacts with the phenolic groups of said polyhydric phenol (A), and (C) up to about 70% by weight of a fusible condensation product of formaldehyde and a phenol.

8. The composition of matter as described in claim 7 wherein the pentanoic acid of (A) consists essentially of 4,4-bis(4-hydroxyaryl)- pentanoic acid wherein the hydroxyaryl radical is a hydroxyphenyl radical and is free from substituents other than alkyl groups of one carbon atom.

9. The composition of matter as described in claim 7 wherein the pentanoic acid of (A) is 4,4-bis(4-hydroxyphenyl)pentanoic acid.

10. The composition of matter as described in claim 9 wherein (B) is a polyglycidyl ether of a member of the group consisting of polyhydric phenols and polyhydric alcohols.

11. The composition of matter as described in claim 9 wherein (B) is a polyepoxy polyester of tetrahydrophthalic acid and a glycol wherein the epoxy oxygen bridges adjacent carbon atoms on the tetrahydrophthalic acid moiety.

12. The composition of matter as described in claim 9 wherein (B) is an aliphatic polyepoxide, said polyepoxide having only hydroxyl groups in addition to oxirane groups.

13. The composition of matter comprising the condensation product obtained by heating (A) a polyhydric phenol which is the ester of (1) a pentanoic acid consisting essentially of 4,4-bis(4-hydroxyaryl)pentanoic acid wherein the hydroxyaryl radical is a hydroxyphenyl radical and is free from substituents other than alkyl groups of from 1-5 carbon atoms and (2) an ester of an aliphatic hydrocarbon alcohol and an aliphatic monocarboxylic acid of from about 10-36 carbon atoms with said acid having in addition to the carboxyl radical at least one radical selected from the group consisting of hydroxyl and oxirane radicals, wherein said components (1) and (2) are chemically bonded through the esterification of the carboxyl group of (1) with at least one of said hydroxyl and oxirane radicals of (2), (B) a polyepoxide containing an average of more than one oxirane group per molecule wherein said polyepoxide is composed of the elements carbon, hydrogen and oxygen and having oxygen present only in the groups selected from the group consisting of —OH, —COO—, ethereal oxygen and oxirane groups; wherein said polyepoxide (B) reacts with the phenolic groups of said polyhydric phenol (A), and (C) up to about 70% by weight of a fusible condensation product of formaldehyde and at least one organic ammonia derivative selected from the group consisting of urea, thiourea, melamine, p-toluenesulfonamide and alkyl substituted derivatives thereof.

14. The composition of matter as described in claim 13 wherein the pentanoic acid of (A) consists essentially of 4,4-bis(4-hydroxyaryl)-pentanoic acid wherein the hydroxyaryl radical is a hydroxyphenyl radical and is free from substituents other than alkyl groups of one carbon atom.

15. The composition of matter as described in claim 13 wherein the pentanoic acid of (A) is 4,4-bis(4-hydroxyphenyl)pentanoic acid.

16. The composition of matter as described in claim 15 wherein (B) is a polyglycidyl ether of a member of the group consisting of polyhydric phenols and polyhydric alcohols.

17. The composition of matter as described in claim 15 wherein (B) is a polyepoxy polyester of tetrahydrophthalic acid and a glycol wherein the epoxy oxygen bridges adjacent carbon atoms on the tetrahydrophthalic acid moiety.

18. The composition of matter as described in claim 15 wherein (B) is an aliphatic polyepoxide, said polyepoxide having only hydroxyl groups in addition to oxirane groups.

19. A composition of matter comprising a resinous polyhydric phenol which is the ester of (1) a pentanoic acid consisting essentially of 4,4-bis(4-hydroxyaryl)pentanoic acid wherein the hydroxyaryl radical is a hydroxyphenyl radical and is free from substituents other than alkyl groups of from 1-5 carbon atoms and (2) an ester of an aliphatic hydrocarbon alcohol and an aliphatic monocarboxylic acid of from about 10-36 carbon atoms with said acid having in addition to the carboxyl radical at least one radical selected from the group consisting of hydroxyl and oxirane radicals, wherein said components (1) and (2) are chemically bonded through the esterification of the carboxyl group of (1) with at least one of said hydroxyl and oxirane radicals of (2).

20. The composition of claim 19 wherein the pentanoic acid consists essentially of 4,4-bis(4-hydroxyaryl) pentanoic acid wherein the hydroxyaryl radical is a hydroxyphenyl radical and is free from substituents other than alkyl groups of one carbon atom.

21. The composition of claim 19 wherein the pentanoic acid is 4,4-bis(4-hydroxyphenyl)pentanoic acid.

References Cited in the file of this patent

Bader: Jour. Amer. Chem. Soc., volume 76, pages 4465-6, (September 1954). (Copy in S. L.)

UNITED STATES PATENT OFFICE
CERTIFICATE OF CORRECTION

Patent No. 2,907,726                                October 6, 1959

Sylvan O. Greenlee

It is hereby certified that error appears in the printed specification of the above numbered patent requiring correction and that the said Letters Patent should read as corrected below.

Columns 17 and 18, columns 19 and 20, and columns 21 and 22, in the table, in the heading to the third column thereof, lines 1 and 2, for "diphenolic acid", each occurrence, read -- Diphenolic Acid --.

Signed and sealed this 26th day of July 1960.

(SEAL)
Attest:

KARL H. AXLINE                                    ROBERT C. WATSON
Attesting Officer                                  Commissioner of Patents